United States Patent [19]

Smith et al.

[11] 4,064,768

[45] Dec. 27, 1977

[54] DETENT MECHANISM WITH ARC TRAVEL LIMITER

[75] Inventors: Spencer E. Smith, Western Springs; Donald C. Marek, Hickory Hills, both of Ill.

[73] Assignee: International Harvester Company, Chicago, Ill.

[21] Appl. No.: 745,886

[22] Filed: Nov. 29, 1976

[51] Int. Cl.$^2$ ........................ G05G 5/06; B60K 20/06; B60K 20/08

[52] U.S. Cl. ................................ 74/528; 74/473 SW; 74/475; 74/529

[58] Field of Search .......... 74/529, 531, 532, 528 CL, 74/475, 473 SW

[56] References Cited

U.S. PATENT DOCUMENTS

| | | | |
|---|---|---|---|
| 3,198,923 | 8/1965 | Tripp | 74/528 UX |
| 3,386,311 | 6/1968 | Kobayashi et al. | 74/531 |
| 3,470,764 | 10/1969 | Frymire | 74/528 |
| 4,036,078 | 7/1977 | Mueling | 74/529 |

*Primary Examiner*—Leonard H. Gerin

*Attorney, Agent, or Firm*—Douglas W. Rudy; Floyd B. Harman

[57] ABSTRACT

A transverse appendage is spring biased into contact with a protuberance equipped platform. The platform protuberances act as detents impending arcuate travel of the transverse appendage. Tabs extending upwardly from the platform positively limit the arcuate travel of the transverse appendage.

7 Claims, 4 Drawing Figures

DETENT MECHANISM WITH ARC TRAVEL LIMITER

BACKGROUND OF THE INVENTION

A detent mechanism for holding the location of an input shaft and preventing its arcuate travel is provided.

Numerous detent mechanisms are known in the prior art. The devices known by the Applicants are either of the type used to control electrical settings such as seen in television channel selectors, rotatable through 360° or of the type using an arcuate toothed rack and a ratchet of some type. The Applicants are not aware of any detent mechanisms that have the configuration and advantages of their invention.

This invention provides a detent mechanism that limits the arcuate travel of the input vehicle also providing positional transversable detent protuberances. The device is simple in operation and construction, inexpensive to manufacture and effective in performing its designed for service.

SUMMARY OF THE INVENTION

A detent mechanism that positively limits extremes of arcuate travel and impedes intra-extremes of arcuate travel is provided. A platform is formed with a control shaft receiving aperture, first and second tabs extending upwardly from the platform, and a plurality of upwardly extending protuberances. A control shaft is positioned through the platform. It is provided with a perpendicular aperture fitted with a spring pin such that the spring pin rests on the platform between the tabs. The control shaft is spring loaded to keep the spring pin in contact with the upper surface of the platform.

DETAILED DESCRIPTION OF THE INVENTION

Figure 1:
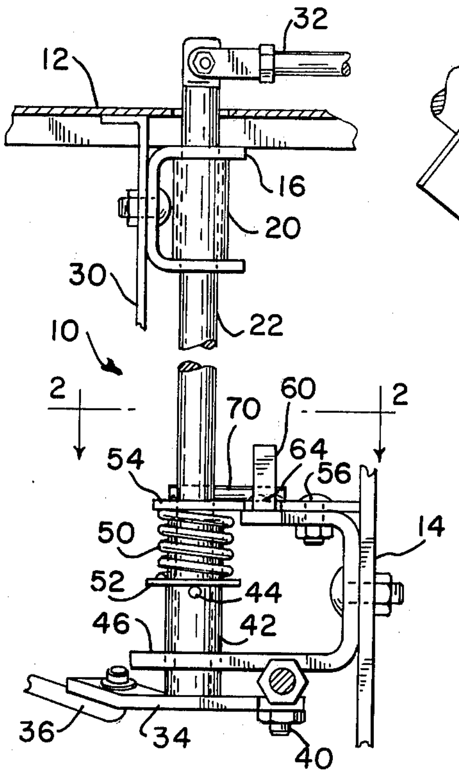
FIG. 1 presents an elevation view of the detent mechanism and its usual environment.

The FIG. 1 presentation of the entire detent and limiting mechanism, generally 10, may be envisioned as a control input for use in a vehicle. The mechanism 10 would generally be mounted through an instrument panel 12 of a vehicle and supported through attachment to a support plate 14 at the lower end of the device. An alignment bracket 16 grounded to a support means 30 including a bushing 20 may assist in maintaining the location of the rotatable control rod 22 with respect to the instrument panel 12.

The control rod 22 may be rotated through a limited arc by a rotating means such as the tiller 32. Arcuate displacement of the tiller 32 will result in equal displacement of the forward-reverse bell crank 34 to which first and second output rods 36 and 40 are attached. The bell crank 34 is attached to a collar 42 which is pinned with pin 44 to the control rod 22. The collar 42 passes through an aperture in the platform bracket and guide 46 which is grounded to the support plate 14.

A biasing means such as spring 50 is located around the collar 42 on a washer 52 restrained by pin 44. The spring 50 is compressed between the detent platform 54 and the washer 52. The detent platform 54 is fixed to the platform bracket and guide 46 by suitable means such as fastener 56.

The detent platform 54 is a generally flat plate having upwardly extending tabs, a first one shown as 60, and a plurality of protuberances, a first one shown as 64.

The control rod 22 is further equipped with a bore for receiving a transverse appendage such as the spring pin 70. The transverse appendage is not to be limited to a spring pin as shown however.

Figure 2:
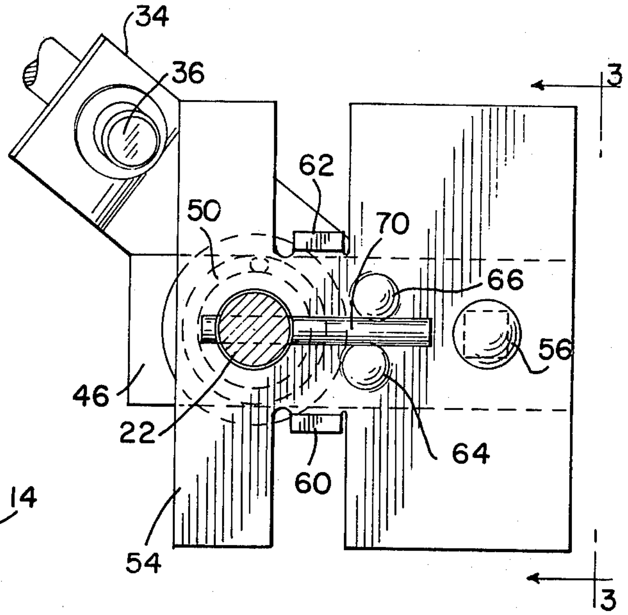
FIG. 2 is a plane view through 2—2 of FIG. 1.
Figure 3:
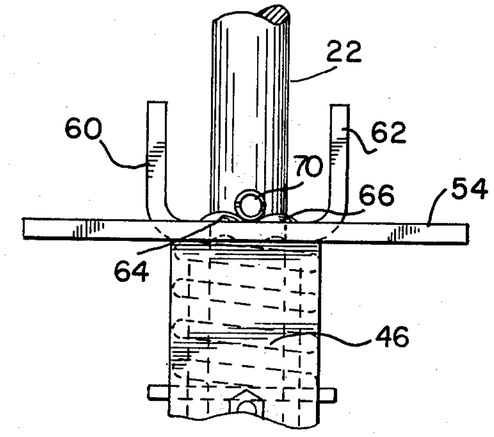
FIG. 3 is an elevation view of a portion of the detent mechanism as taken through plane 3—3 of FIG. 2.

As the crux of this invention depends on the interaction of the spring pin 70 and the detent platform 54, looking to FIGS. 2 and 3 will present a more clear picture. In these figures the control rod 22, having the spring pin 70 is urged into contact with the detent platform 54. Tabs 60 and 62 absolutely limit the arcuate travel of the control rod 22, while first and second protuberances 64 and 66 impede the arcuate traversal of the spring pin 70. The detent platform 54 is fixed to the platform bracket and guide 46 via fastener 56.

In operation it would be useful to utilize the invention in a transmission gear selecting apparatus. The location of the spring pin 70 between the protuberances 64 and 66 would correspond to a neutral transmission setting. Displacement of the spring pin 70 between the second protuberance 66 and the second tab 62 corresponds to forward while displacement between the first protuberance 64 and the first tab 60 corresponds to reverse gear selection.

As the control rod 22 is moved from the neutral position as by tiller 32 the spring pin 70 will pass over either protuberance on the platform. As the pin passes over the protuberance the spring 50 will be compressed. After the pin 70 has passed over the protuberance it will be cradled securely between one of the tabs and the adjacent protuberance. Of course when the spring pin 70 is in the neutral position it is cradled between the protuberances. The detent mechanism gives a positive detent feeling so that the operator knows when he is in the desired location.

Furthermore the spring pin 70 and the control rod 22 are held in a relatively vibration free manner due to the positive simultaneous contact of the spring pin by a tab and a protuberance or two protuberances.

Also significant to this invention is the placement of the protuberances 64 and 66. Notice in FIG. 2 that the protuberances are on different arcs with respect to the axis of the control rod 22. Thus the distance from this axis is different for each protuberance. This is done to prevent the spring pin or its equivalent from becoming worn at a single point corresponding to the high points of the protuberances. Two wear areas may eventually develop in the illustrated embodiment, however, this would take almost twice as long as it would if the protuberances were on the same arc.

Figure 4:
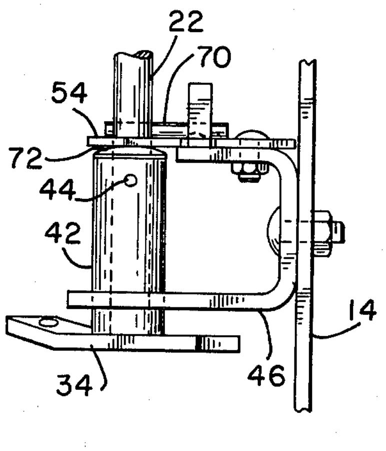
FIG. 4 is an elevation view of an alternative embodiment of a detent mechanism.

An alternative embodiment is shown in FIG. 4. The significant difference is the use of the spring washer 72 between the collar 42 and the bottom of the detent platform 54. The control rod 22 is still pinned by pin 44 to move with the collar 42 and the forward-reverse bell crank 34. As in the first embodiment the platform bracket and guide 46 is grounded to a support plate 14. The spring pin 70 coacts with the tabs and protuberances of the detent platform 54 in the previously described manner.

Thus it is apparent that there has been provided a detent mechanism that satisfies the objects and advantages as set forth above. While the invention has been described in conjunction with specific embodiments thereof it is evident that many alternatives, modifications, and variations will be apparent to those skilled in the art in light of the foregoing description. Accordingly, it is intended to embrace all such alternatives, modifications, and variations as fall within the scope of the appended claims.

What is claimed is:

1. A detent mechanism comprising:

a fixed detent platform having an aperture therethrough, first and second upwardly extending tabs and first and second protuberances formed in said detent platform on arcuate paths between said tabs;

a rotatable control rod passing through said aperture of said detent platform, said control rod having a transverse appendage extending outward from said control rod in contact with the top surface of said detent platform between said first and second upwardly extending tabs;

a biasing means carried on said control rod to urge said transverse appendage into contact with the detent platform whereby said first and said second tabs absolutely limit the arcuate travel of said control rod through contact with said transverse appendage and said first and second protuberances impede the arcuate travel of said control rod through spring loaded contact with said transverse appendage.

2. The detent mechanism in accordance with claim 1 wherein said first and second protuberances are located on arcuate paths between said tabs each arcuate path distinct from the other.

3. The detent mechanism in accordance with claim 1 wherein said transverse appendage of said control rod is a spring pin projecting out from said control rod.

4. The detent mechanism in accordance with claim 1 wherein said biasing means is a spring carried on said control rod and supported by a washer on said control rod maintained in place by a pin, the spring compressed between the bottom of said detent platform said said washer.

5. A detent mechanism comprising:

a fixed detent platform having an aperture therethrough, first and a second upwardly extending tabs, and first and second protuberances formed in said detent platform on different arcuate paths between said tabs;

a platform bracket and guide having an aperture therethrough grounded to provide a firm mounting for said detent platform;

a rotatable control rod passing through said aperture of said detent platform and said aperture of said platform bracket and guide, said control rod having a transverse appendage extending outward from said control rod in contact with the top surface of said detent platform between said first and second upwardly extending tabs;

a collar fitted around the lower portion of said control rod and fixed to said control rod by means of the pin through the collar and the control rod;

a forward-reverse bell crank fixedly attached to said collar;

a biasing means carried on said collar urging said transverse appendage into contact with the detent platform whereby said first and second tabs absolutely limit the arcuate travel of said control rod through contact with said transverse appendage and said first and second protuberances impede the arcuate travel of said control rod through spring loaded contact with said transverse appendage.

6. The detent mechanism in accordance with claim 5 wherein said biasing means is a spring carried on the outside of said collar and supported by a washer maintained in place girding said collar by said pin, the spring compressed between the bottom of said detent platform and said washer.

7. The detent mechanism in accordance with claim 5 wherein said biasing means is a spring washer carried on the upper end of said collar, the spring washer compressed between the bottom of said detent platform and said collar.

* * * * *